United States Patent [19]

Azuma

[11] Patent Number: 4,751,638
[45] Date of Patent: Jun. 14, 1988

[54] BUFFER STORAGE CONTROL SYSTEM HAVING BUFFER STORAGE UNIT COMPARING OPERAND (OP) SIDE AND INSTRUCTION FETCH (IF) SIDE TAG STORAGES

[75] Inventor: Isao Azuma, Yokohama, Japan

[73] Assignee: Fujitsu Limited, Kawasaki, Japan

[21] Appl. No.: 678,676

[22] Filed: Dec. 5, 1984

[30] Foreign Application Priority Data

Dec. 9, 1983 [JP] Japan .............. 58-233103

[51] Int. Cl.⁴ .................................. G06F 12/06
[52] U.S. Cl. ........................................ 364/200
[58] Field of Search ... 364/200 MS File, 900 MS File

[56] References Cited

U.S. PATENT DOCUMENTS

| 3,982,231 | 9/1976 | Bernstein | 364/200 |
| 4,214,304 | 7/1980 | Shimizu | 364/200 |
| 4,290,103 | 9/1981 | Hattori | 364/200 |
| 4,493,026 | 1/1985 | Olnowich | 364/200 |
| 4,550,367 | 10/1985 | Hattori | 364/200 |

Primary Examiner—Archie E. Williams, Jr.
Assistant Examiner—Emily Y. Chan
Attorney, Agent, or Firm—Staas & Halsey

[57] ABSTRACT

A buffer storage control system is incorporated in a multiprocessor and includes therein operand side buffer storages and instruction fetch side buffer storages. Under control of the system, a store operation is achieved with the use of an identification flag, which indicates that the related address invalidation is to be effected at the operand side or the instruction fetch side, while a fetch operation is achieved with the use of the identification flag which indicates that the related store address is to be recorded in the operand side buffer memory (TAG) or the instruction fetch side buffer memory (TAG).

11 Claims, 7 Drawing Sheets

| Fig.5A | Fig.5B |

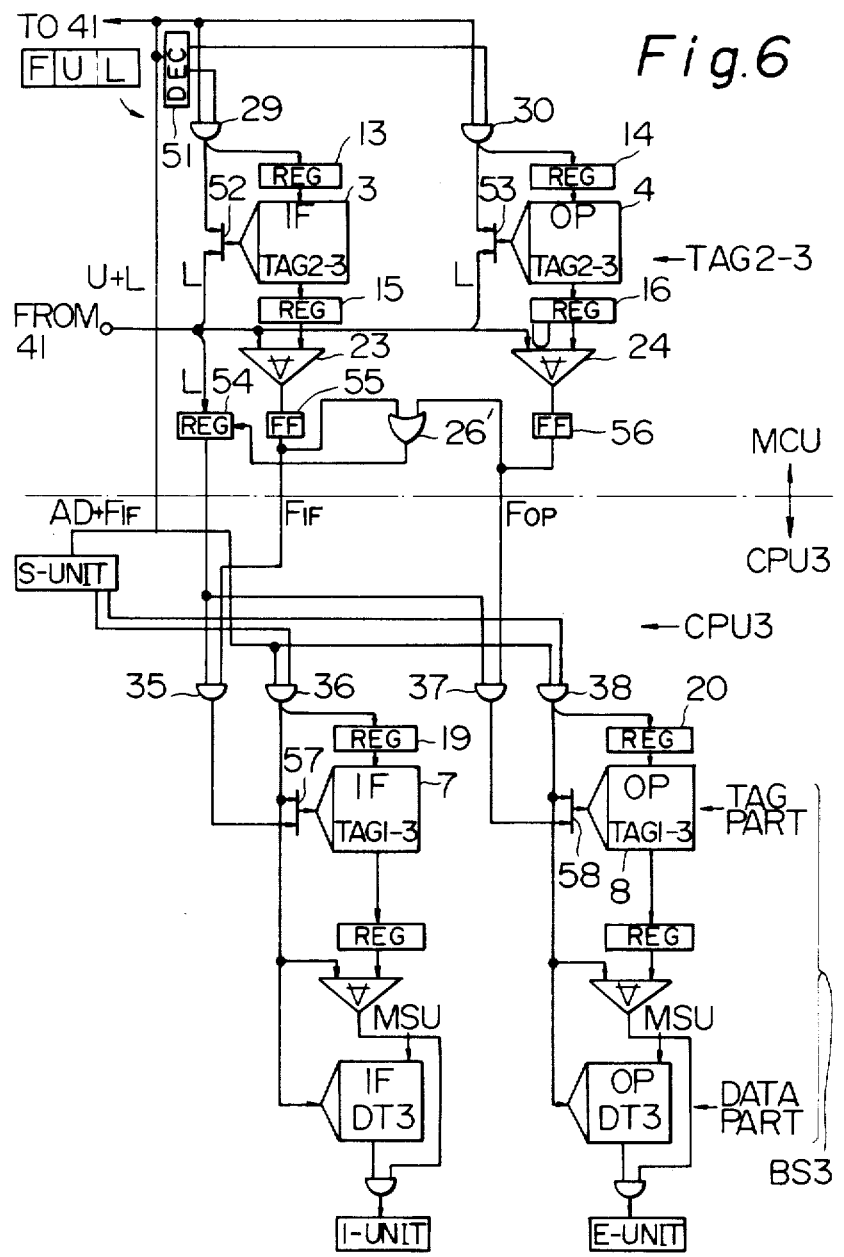

BUFFER STORAGE CONTROL SYSTEM HAVING BUFFER STORAGE UNIT COMPARING OPERAND (OP) SIDE AND INSTRUCTION FETCH (IF) SIDE TAG STORAGES

BACKGROUND OF THE INVENTION

1. Field of the Invention

The present invention relates to a buffer storage control system in a processor, preferably a multiprocessor, and more particularly to a buffer storage control system including separately therein both a buffer storage for dealing with operand data and a buffer storage for dealing with instruction fetch data.

2. Description of the Related Art

A conventional processor, for example, a multiprocessor, includes a plurality of central processing units (CPU's), a main storage unit (MSU), and a main storage control unit (MCU). The MCU works to control data transfer between the MSU and CPU's.

Recent multiprocessors have featured very high-speed processing. This is achieved by introduction of a buffer storage unit, i.e., a so-called cache memory, into each CPU. The buffer storage unit momentarily holds therein some of the block data read from the MSU, so that the CPU can operate with the use of data held in its buffer storage unit.

In such a multiprocessor, it is important to maintain constant data coincidence between the MSU and the buffer storage units of all the CPU's. That is, if data in a buffer storage unit of one CPU is rewritten, the related data stored in the MSU and the buffer storage units of other CPU's, if any, must be invalidated or rewritten to include the same content. If such data coincidence is not maintained, data errors will clearly be produced by the multiprocessor.

In a multiprocessor of the type having both an operand buffer storage and an instruction fetch buffer, storage data coincidence must also be maintained to prevent such data error.

No simple technique to maintain data coincidence has been proposed, however.

SUMMARY OF THE INVENTION

It is an object of the present invention to provide a buffer storage control system which can easily maintain data coincidence, particularly in a multiprocessor having separate operand and instruction fetch buffer storages.

The above object is attained with the use of an identification flag which indicates to which side, i.e., the operand side and/or the instruction fetch side, data coincidence should be made.

A buffer storage control system incorporated in a multiprocessor including therein operand side buffer storages and instruction fetch side buffer storages. Under control of the system, a store operation is achieved with the use of an identification flag, which indicates that a related address invalidation is to be effected at the operand side or the instruction fetch side, while a fetch operation is achieved with the use of the identification flag which indicates that the related store address is to be recorded in the operand side buffer memory or the instruction fetch side buffer memory.

BRIEF DESCRIPTION OF THE DRAWINGS

The present invention will be more apparent from the ensuing description with reference to the accompanying drawings, wherein:

FIG. 6 illustrates a detailed circuit diagram of each pair of TAG2 and CPU, using TAG2-3 and CPU3 as a representative example.

DESCRIPTION OF THE PREFERRED EMBODIMENTS

Before describing the preferred embodiments, a discussion will be made of a prior art processor for reference.

Figure 1:
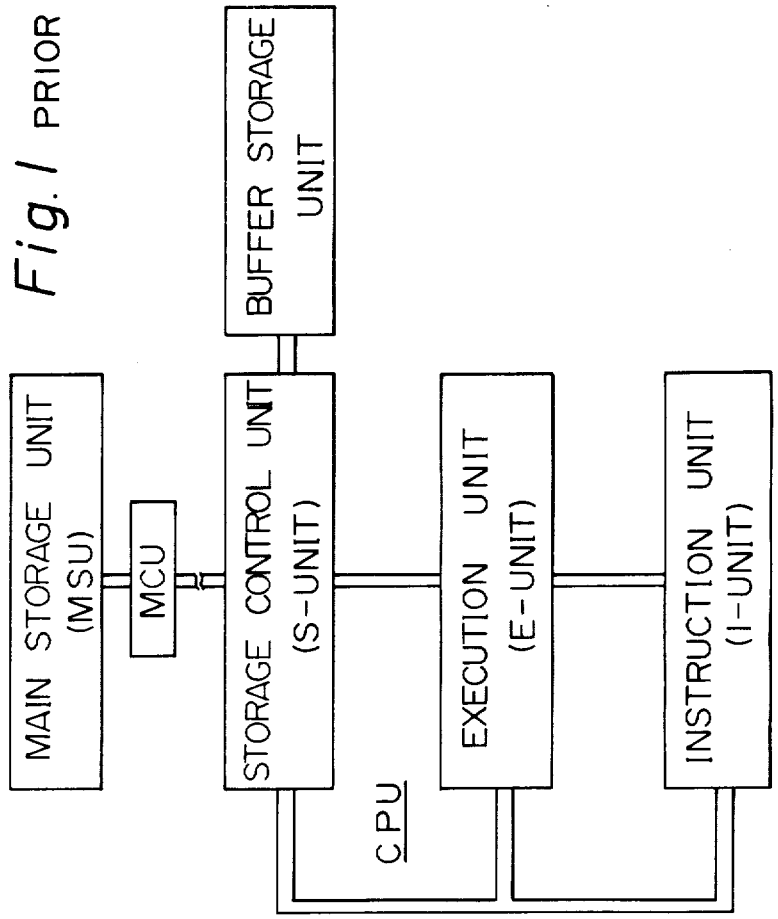
FIG. 1 is a general block diagram of a conventional processor to which the present invention basically relates.

FIG. 1 is a general block diagram of a conventional processor to which the present invention basically relates. A CPU is constructed with three functional blocks and two major storage units. The first of the three functional blocks is represented by an instruction unit (I-Unit) which operates to decode each instruction and then control the operation, as a whole, thereby. The second is an execution unit (E-Unit) which performs logic and/or arithmetic operations. The third is a storage control unit (S-Unit) which operates to control accesses for the two storage units, i.e., the buffer storage unit and/or the MSU. The MSU is connected with the S-unit, via an MCU.

Figure 2:
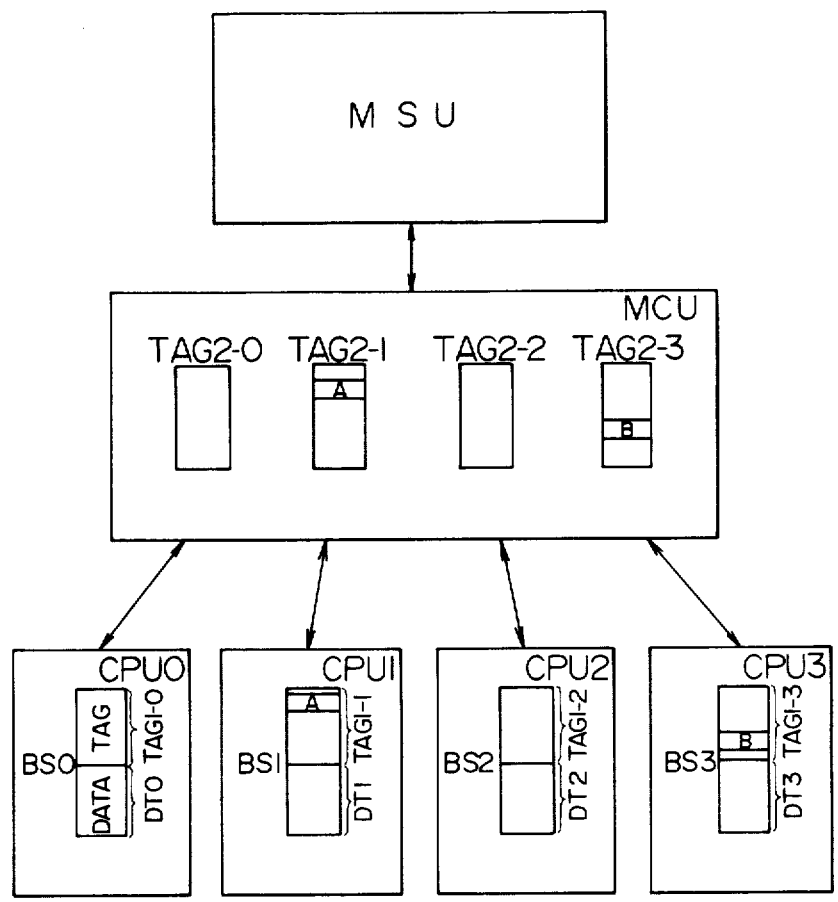
FIG. 2 is a general block diagram of a conventional multiprocessor.

FIG. 2 is a general block diagram of a conventional multiprocessor. The multiprocessor is constructed with a plurality of CPU's (four units, i.e., CPU0 through CPU3 are shown in FIG. 2), an MCU, and an MSU. The MCU, as previously mentioned, works to control data transfer between the MSU and the CPU0 through CPU3. Each CPU (CPU0 through CPU3) contains therein a buffer storage unit, i.e., one of cache memories BS0 through BS3. The CPU's momentarily store therein desired block data transferred from the MSU. The CPU's then proceed in operation with the use of the thus momentarily held data.

The buffer storage unit BS0 includes a tag part TAG1-0 and a data part DT0. Similarly, the units BS1, BS2, and BS3 respectively include (TAG1-1, DT1), (TAG1-2, DT2), and (TAG1-3, DT3). It should be understood that each data part (DT) usually stores therein a mixture of instruction fetch (IF) data and operand (OP) data. Each of the data parts (DT) works to store block data transferred from the MSU. Each of the tag parts (TAG1) is provided to record addresses, in terms of the main storage address, regarding the data transferred to and stored in the corresponding data part (DT).

In the MCU, buffer storage address memories TAG2-0, TAG2-1, TAG2-2, and TAG2-3 are contained therein for CPU0 through CPU3, respectively. Each of the buffer storage address memories (TAG2) works to record addresses, in terms of the main storage address, regarding the data transferred to and stored in the corresponding CPU, as does each tag part (TAG1).

In the multiprocessor of FIG. 2, suppose CPU1 request a fetch of data from the MSU, at its address "A", to the buffer storage unit BS1. In this case, the identical address "A" is recorded in not only the tag part TAG1-1, but also in the buffer storage address memory TAG2-1 by means of the S-Unit (not shown in FIG. 2).

Suppose, next, CPU2 requests to write some data in the MSU, at its address "B". In this case, the related data for "B" is transferred to the MSU. At this time, the MCU operates to determine whether the identical address "B" is recorded in any of the buffer storage address memories TAG2-0, TAG2-1 and TAG2-3. If, for example, the MCU finds that the identical address "B" exists in the memory TAG2-3, the MCU sends the address "B" to the corresponding CPU3. CPU3 receives the thus sent address "B" and invalidates the identical address "B" recorded in its tag TAG1-3.

Suppose, then, CPU3 requests to use the data corresponding to the address "B". In this case, however, CPU3 cannot use the data corresponding to the address "B". This is because the address "B" has been erased due to the above mentioned invalidation for "B". In this case, CPU3 must request a fetch of data from the MSU, at its address "B", to the buffer storage unit BS3 again. This fetched data corresponding to "B" is not necessarily the same as the previous corresponding data at "B". This is because the related data at "B" has been rewritten by CPU2, as mentioned before. Even so, the above-mentioned data coincidence can always be guaranteed in the multiprocessor due to the invalidation.

Apart from the above-mentioned multiprocessor of FIG. 2, a certain processor has been proposed in, for example, "NIKKEI ELECTRONICS" 5-11, 1981, No. 264, pages 174 to 200, published in Japan, which contains the separated operand (OP) buffer storage and instruction fetch (IF) buffer storage, as the buffer storage unit, so as to attain high-speed processing of the processor. The present invention refers to a buffer storage system which enables maintenance of data coincidence in such a multiprocessor having separate operand buffer and instruction fetch buffer storages as the buffer storage units. To be specific, the present invention relates to a technique for achieving data transfer suitable for establishing data coincidence in a multiprocessor as mentioned immediately above.

Figure 3:
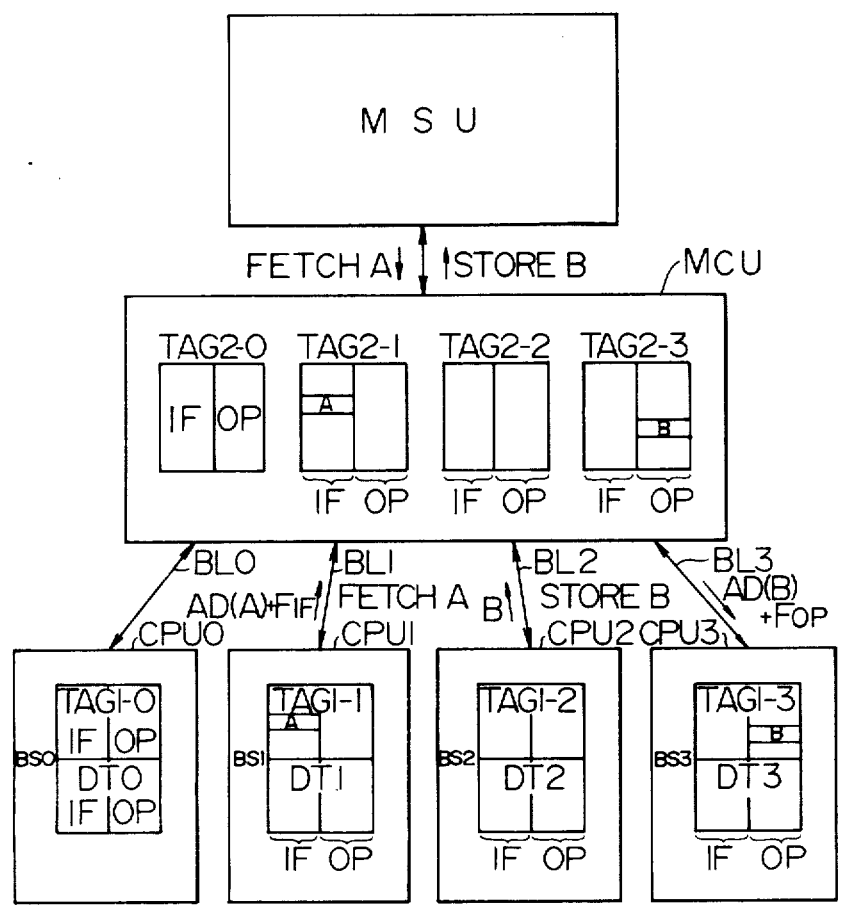
FIG. 3 is a general block diagram of a multiprocessor on which the present invention is based.

FIG. 3 is a general block diagram of a multiprocessor on which the present invention is based. In FIG. 3, members identical to those of previous figures are represented by the same reference characters (same for later figures). As illustrated in FIG. 3, CPU0 contains therein the buffer storage BS0 including the tag part TAG1-0 and the data part DT0. The tag part TAG1-0 is separated into an instruction fetch (IF) side and operand (OP) side. The data part DT0 is also separated into an IF side and OP side. The IF side data part DT0 stores the instruction fetch data, while the OP side data part DT0 stores the operand data. The IF side and OP side tag parts TAG1-0 record the addresses, in terms of the main storage address, corresponding to the stored instruction fetch data and the operand data, respectively. Similarly, in CPU1 through CPU3, the tag parts (TAG1-1 through TAG1-3) and the data parts (DT1 through DT3) are, respectively separated into IF sides and OP sides.

In the MCU, each of the buffer storage address memories TAG2-0 through TAG2-3 is also separated into an IF side and OP side, in correspondence with the IF side and OP side buffer storage units of each CPU (CPU0 through CPU3). Each of the buffer storage address memories TAG2-0 through TAG2-3 works to record addresses, in terms of the main storage address, for the data transferred to and stored in the corresponding CPU, as does each tag part (TAG1) of the buffer storage units (BS).

In the multiprocessor of FIG. 3, the inventor has previously attempted to wire four pairs of bus lines between four CPU's, i.e., CPU0 through CPU3, and the MCU, respectively. Each pair of bus lines is fabricated by a separate IF side bus line and OP side bus line. Such a construction, however, clearly increases the size of the hardware and the manufacturing costs and is not suitable for practical use, since each of the eight bus lines, in the case of FIG. 2, should be made of many, for example, about 70 bit lines. Contrary to the above, according to the present invention, the hardware between the MCU and the CPU's is very simple, as clarified hereinafter.

In FIG. 3, suppose the CPU1 requests a fetch of certain data, i.e., instruction fetch data or operand fetch data (in this case, instruction fetch (IF) data, as an example) from the MSU, at address "A", to the buffer storage unit BS1. In this case, CPU1 operates to store the thus fetched IF data in the IF side data part DT1 and also record the identical address "A" in the tag part TAG1-1, as usual. At this time, CPU1 transfers an identification flag (F) to the MCU, together with the address "A" concerned, via a bus line BL1. This information is represented by $AD + F_{IF}$ in FIG. 3, where the character AD represents the address concerned, i.e., "A", and the character $F_{IF}$ represents the identification flag, which indicates that the address "A" is to be stored in the IF side buffer storage address memory TAG2-1. According to the flag $F_{IF}$, the MCU operates to record the address A in the IF side TAG2-1, as illustrated by A in FIG. 3.

Suppose, next, CPU2 requests to write some operand data, i.e., store operation, in the MSU at its address "B". In this case, both the related operand data and address "B" are transferred to the MSU via the bus line BL2 and the MCU. At this time, the MCU operates to investigate whether an identical address "B" is recorded in any of the remaining memories TAG2-0, TAG2-1, and TAG2-3. If it is found that the identical address "B" exists in the OP side or IF side memory, for example, in the OP side memory TAG2-3, the MCU operates to invalidate the address "B" recorded in TAG2-3, and, at the same time, operates to transfer the identification flag "$F_{OP}$" to CPU3, via the bus line BL3, as represented by $AD + F_{OP}$ in FIG. 3. The identification flag $F_{OP}$ indicates that the transferred address AD, i.e., "B", is recorded in the OP side tag part TAG1-3. In response to the thus sent address AD(B), CPU3 operates to invalidate the address "B" recorded in the OP side tag part TAG1-3. This is because the OP side address in the TAG2 always corresponds to the OP side address in TAG1.

Figure 4:
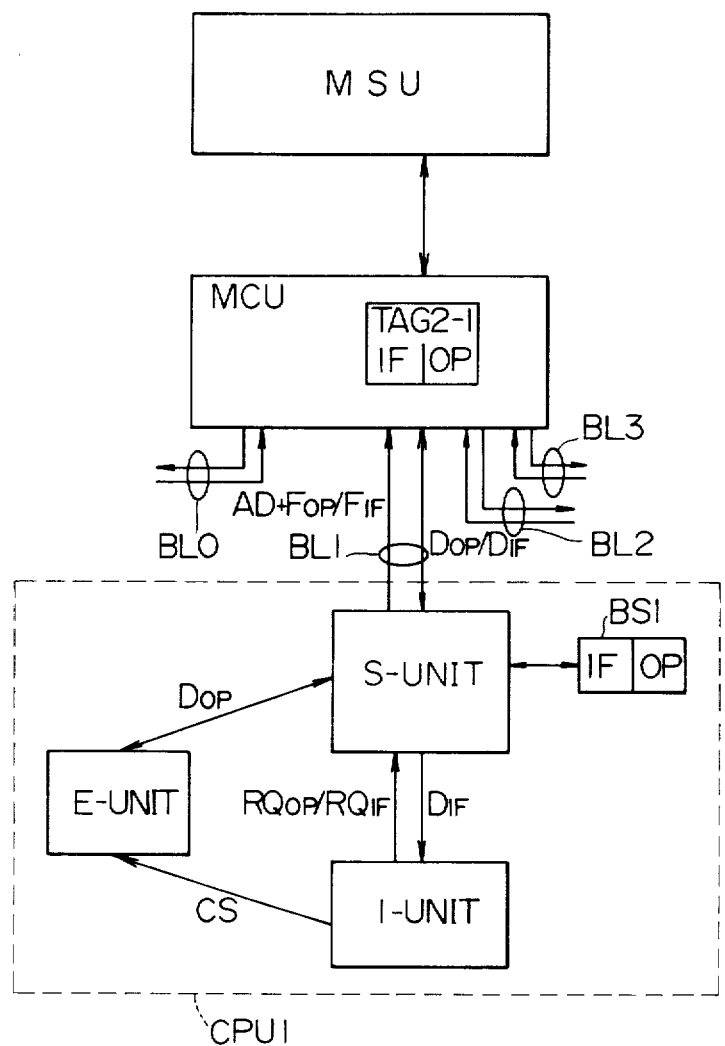
FIG. 4 is a more detailed block diagram of the multiprocessor shown in FIG. 3.

FIG. 4 is a more detailed block diagram of the multiprocessor shown in FIG. 3. Only one CPU is illustrated, i.e., CPU1, because the CPU's have the same construction. As briefly mentioned before with reference to FIG. 1, the I-Unit operates to supervise and control the E-Unit and the S-Unit for execution of machine word instructions. When the I-Unit requests a fetch of desired machine word instructions themselves stored in the MSU, it issues a request for fetch, shown as $RQ_{IF}$, to the S-Unit. On the other hand, when the I-Unit requests a read of operand data to be used under the machine word instructions, from the MSU, it issues a request for operand fetch, shown as $RQ_{OP}$.

Under the supervision of the I-Unit, the S-Unit, provided with IF side and OP side buffer storages BS1, performs access control of data with respect to the MSU. That is, the S-Unit sends the request $RQ_{IF}$ of $RQ_{OP}$ issued from the I-Unit, together with the related address AD, to the MCU via the bus line BL1 in the form of $AD+F_{OP}/F_{IF}$. The characters $D_{OP}$ correspond to operand fetch or operand store data, $D_{IF}$ to instruction fetch data, CS to a control signal, $F_{OP}$ to identification flag indicative of the operand side, and $F_{IF}$ to that of the instruction fetch side.

Figures 5, 5A:
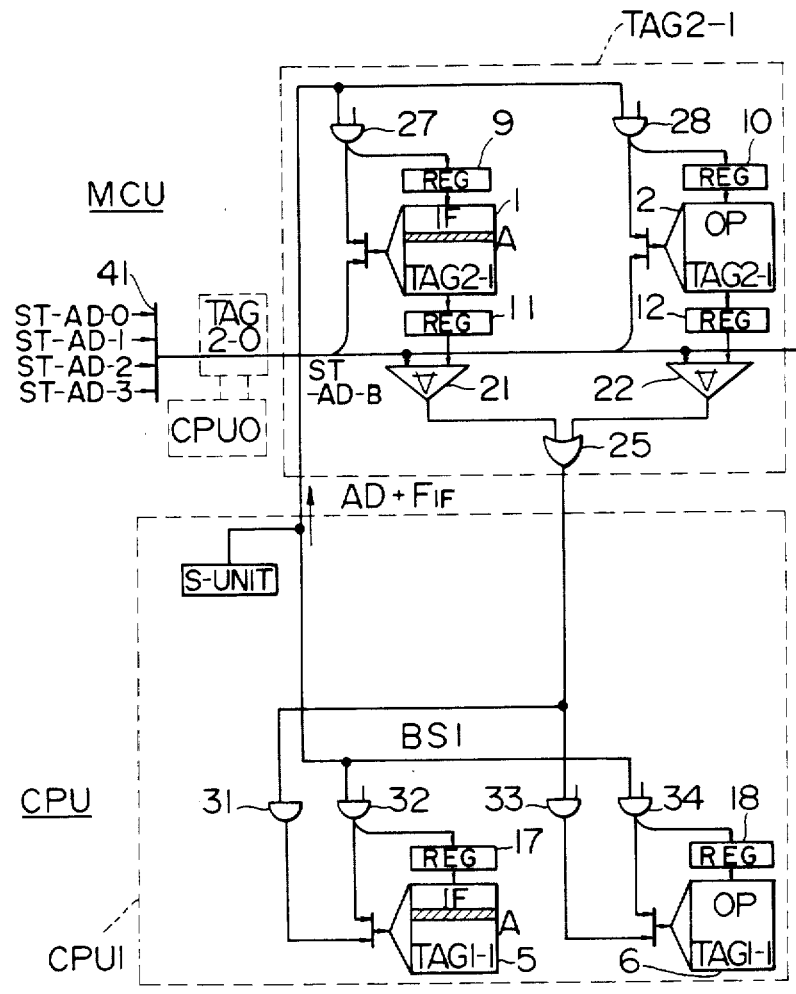
FIGS. 5A and 5B produce a detailed circuit diagram of the multiprocessor shown in FIGS. 3 and 4, incorporating therein the buffer storage control system according to the present invention.
Figures 5, 5B:
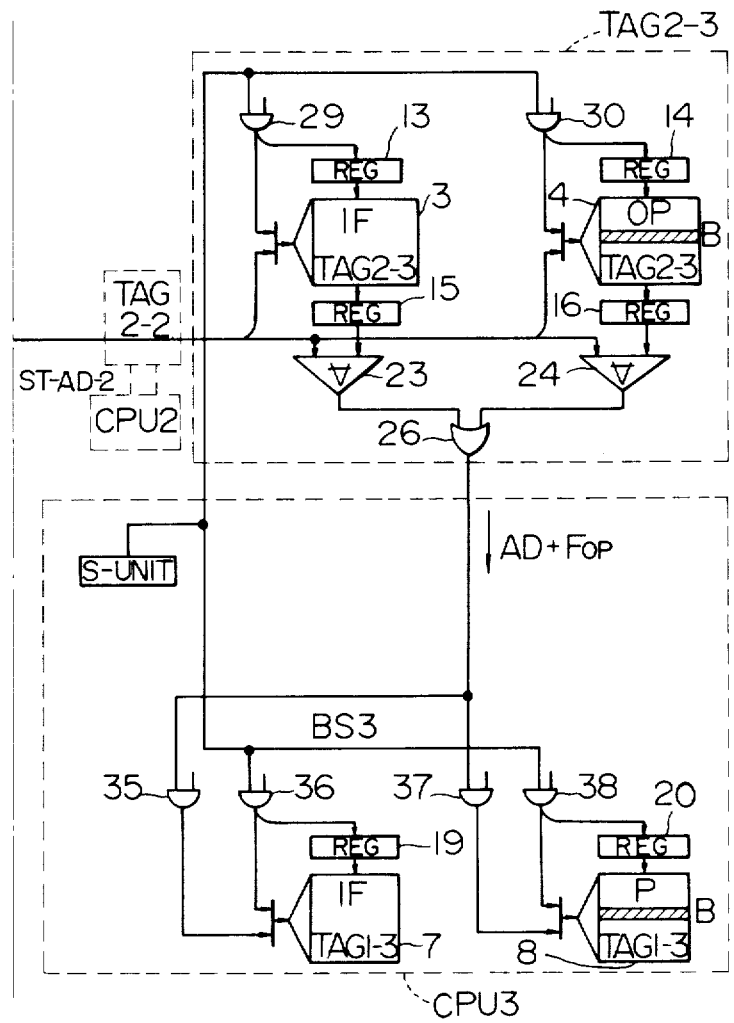

FIG. 5 is a detailed circuit diagram of the multiprocessor shown in FIGS. 3 and 4, incorporating therein the buffer storage control system according to the present invention. It should be understood that only the MCU and the CPU are illustrated for brevity, further only the CPU1 and the CPU3 are illustrated in detail, since the other CPU's have the same construction as those shown in FIG. 5. Furthermore, regarding the buffer storage units (BS1, BS3), only the IF and OP side tag parts (TAG1-1, TAG1-3) are illustrated in detail, i.e., the IF and OP side data parts (DT1, DT3) are not illustrated (but are illustrated in FIG. 6). In FIG. 5, reference numerals 1 through 4 represent the buffer storage address memories (TAG2-1, TAG2-3); 5 through 8, tag parts of the buffer storage units (TAG1-1, TAG1-3); 9 through 20, registers; 21 through 24, comparing circuits; 25 and 26, OR gates; and 27 through 38, AND gates.

The operations will be explained by taking as an example the case where CPU1 requests a fetch of the IF data $D_{IF}$ from the MSU, at its address "A", to the buffer storage BS1, and the case where CPU3 stores, in the data part DT3 of the buffer storage BS3 (FIG. 3), the operand data $D_{OP}$ of the address "B" and CPU2 requests to write certain operand data $D_{OP}$ in the MSU at its address "B".

In the first case, CPU1 operates to register the address "A" in the IF side tag part (TAG1-1) 5, since the IF side is specified in this case. At the same time, since CPU1 had transferred the related address AD, i.e., "A", together with the identification flag indicative of $F_{IF}$, in the form of $AD+F_{IF}$, the MCU operates to open the AND gate 27, and the address "A" is written in the IF side memory (TAG2-1) 1. The flag $F_{IF}$ indicates that the address (AD) "A" is to be written in the IF side. The information $AD(A)+F_{IF}$ can be given from the S-Unit of FIG. 4.

In the second case, CPU2 operates to transfer the address "B" from its S-Unit, in the form of ST-AD-2, to the MCU. Then, the MCU operates to apply the store address ST-AD-2 to an OR gate 41 and investigates to determine whether the identical address "B" is recorded in any of the buffer storage address memories TAG2-0 through TAG2-3. The transfer of addresses to OR gate 41 will be explained in detail later. Identical store addresses ST-AD-0, ST-AD-1 and ST-AD-3 are applied to the OR gate 41 too, when the CPU0, CPU1, and CPU3 request individual store operations of operand, respectively. For the above-mentioned investigation, first, the corresponding addresses are read from each of the IF and OP side memories TAG2-0 through TAG2-3. The thus read addresses are applied to each second input of the comparing circuits, such as 21 through 24, via the registers, such as 11, 12 and 15, 16, respectively. On the other hand, each first input of these comparing circuits receives commonly the store address, i.e., ST-AD-2, in this case indicating the address "B", as shown by ST-AD-B shown in TAG2-1. Thus, each comparing circuit compares the thus given two addresses at its first and second inputs. As supposed previously, the operand data $D_{OP}$ of the address "B" is now stored in the data part DT3 in CPU3. Accordingly, in this case, the address "B" concerned is recorded in the OP side memory (TAG2-3) 4. Therefore, address coincidence therebetween occurs at the comparing circuit 24. In response to this coincidence, the MCU transfers the related address "B", together with the identification flag $F_{OP}$, as shown by $AD+F_{OP}$, to the corresponding CPU3. The information $AD+F_{OP}$ indicates that, in this case, the address "B" is recorded in the OP side tag part (TAG1-3) 8. CPU3 operates, in accordance with the thus given $AD+F_{OP}$, to open the AND gate 37 and then invalidate the address "B" recorded in the OP side tag part (TAG1-3) 8.

It should be understood that, in FIG. 5, some portions are simply illustrated for easy comprehension and not illustrated in detail. This will be clarified with reference to FIG. 6. FIG. 6 is a detailed circuit diagram of each pair of TAG2 and CPU, taking TAG2-3 and CPU3 as a representative example. Other CPU's and their TAG 2 have identical structures to that of FIG. 6. If CPU3 requests a fetch of desired data $D_{IF}$ or $D_{OP}$ (in this case $D_{IF}$, as an example) of the address "A" from the MSU to the buffer storage unit BS3, CPU3 operates to register the address "A" in the IF side tag part (TAG1-3), since the desired data is now IF data $D_{IF}$. During the fetch operation, either the AND gate 36 or 38 is opened, and, in this case, the IF side AND gate 36 is opened by the S-Unit, so as to enter the concerned address "A" in the IF side TAG1-3, via the register 19, at the corresponding TAG address. The TAG address is given, as lower bits (L), from the S-Unit, via the AND gate 36 to an OR gate 57. On the other hand, the upper bits (U) and lower bits (L) specify the address "A" of the MSU. At the same, CPU3 transfers the related address "A" together with the flag $F_{IF}$ with a data format of "$F+U+L$", as shown at the top left in FIG. 6. The symbols F, U, and L denote the flag, the upper bits, and the lower bits, respectively. The MCU operates, first, to open either the AND gate 29 or the AND gate 30. The 2-bit flag F now assumes "10" and the bits "10" are decoded by a decoder DEC 51, so that the AND gate 29 is opened. The thus opened gate 29 allows the lower bits L and the upper bits U to pass therethrough and be applied to the OR gate 52 and the register 13, respectively. Thus, the address "A" is recorded, in the IF side TAG1, in a form wherein the upper bits (U) are stored at the address specified by the lower bits (L).

On the other hand, regarding the store operation, one of the CPU's, for example, CPU2, requests to write certain operand store data $D_{OP}$ in the MSU, at the address "B". Then, the CPU2 operates to transfer the address "B" to the MCU in the form of ST-AD-2 with a data format $U+L$. Then, the MCU operates to apply the data $U+L$, i.e., ST-AD-2, to the OR gate 41 (FIG. 5). The lower bits L for accessing all the TAG2's are commonly applied from the gate 41 to the OR gates such as 52 and 53. If the concerned address "B" is recorded in the OP side memory (TAG2-3) 4, the address "B" is read therefrom by using the bits L and applied to the register 16. The thus read data now indicates the address "B". Thus, the upper bits U of address "B" given via the OR gate 41, coincides with the content of the register 16. This coincidence is detected by the comparing circuit 24 and it sets a flip-flop (FF) 56. The output from the flip-flop 56 is applied, on one hand, to a lower bit register (REG) 54, via the OR gate 26', to activate it and, on the other hand, transferred as the flag $F_{OP}$ to the AND gate 37 in CPU3. Thereby, the gate 37 is opened and allows the lower bits L to pass therethrough from the activated lower bit register 54. The lower bits L specify the address where the concerned address "B" is recorded in the tag part (TAG1-3) 8 so as to invalidate the address B. The invalidation can be achieved by supplying data "0" from the register 20 to the tag part (TAG1-3) 8.

Alternatively, if similar coincidence occurs at the comparing circuit 23, a flip-flop 55 is set thereby. The output from the flip-flop 55, on one hand, activates the register 54 via the OR gate 26' and, on the other hand, is transferred as the flag $F_{IF}$ to the AND gate 35. Thus, the gate 35 is opened and the lower bits L from the register 54 are allowed to pass therethrough and be applied to an OR gate 57 to access the tag part (TAG1-3) 7 so as to invalidate the related address recorded therein.

As explained above in detail, according to the present invention, data coincidence among storage units can be simply guaranteed in a multiprocessor which has separate operand and instruction fetch buffer storages.

I claim:

1. A buffer storage control system, incorporated into a multiprocessor, comprising:
    a plurality of central processing units, a main storage unit storing many data blocks composed of operand data and instruction data, and a main storage control unit connected to said central processor units and said main storage unit and operative to control data transfer between the main storage unit and the central processing units via bus lines;
    each of the central processing units including a buffer storage unit comprising a tag storage unit and a data storage unit, the tag storage unit including an operand (OP) side tag storage and an instruction fetch (IF) side tag storage, the data storage unit including an OP side data storage storing the operand data and an IF side data storage storing the instruction data;
    the main storage control unit having a plurality of buffer storage address memories one for each of said central processing units, each buffer storage address memory including an OP side memory and IF side memory;
    said buffer storage control system being operated using an identification flag, having a value identifying whether an address corresponds to operand data or instruction data, which is produced, during a fetch operation, in any one of said central processing units and transferred with address data for the fetch, via a corresponding one of said bus lines, to the main storage control unit;
    the identification flag being also produced, during a store operation, by the main storage control unit and transferred with a address to be invalidated, via a corresponding one of said bus lines, to the central processing unit concerned, allowing the central processing unit to determine whether data to be invalidated is operand data or instruction data;
    the value of said identification flag indicates, during the fetch operation, whether the address being fetched is to be recorded in said OP side or said IF side memory of said buffer storage address memory; and
    the value of said identification flag indicates, during the store operation by a first one of said central processing units, whether the address being invalidated is to be applied to said OP side or said IF side tag storage of a second one of said central processing units to invalidate the identical address in the indicated side tag storage of the second one of said central processing units.

2. A system as set forth in claim 1, wherein each central processing unit includes an instruction unit, an execution unit and a storage control unit, and during said fetch operation, said identification flag is produced by one of said central processing units through the storage control unit, when the instruction unit issues a request for operand fetch or a request for instruction fetch, together with the address for fetch, and thereby both the identification flag, indicating OP side fetch or IF side fetch, and the related address for fetch are transferred to the main storage control unit.

3. A system as set forth in claim 2, wherein each of said OP side memories includes an OP side logic gate and each of said IF side memories includes an IF side logic gate, either the OP side logic gate or the IF side logic gate being opened in accordance with the identification flag to allow the related address for fetch to pass therethrough and be recorded in the corresponding OP side memory or IF side memory.

4. A system as set forth in claim 3, further comprising a decoder, connected to said main storage control unit and OP side and If side logic gates, for decoding the value of the identification flag and wherein said OP side logic gate or said IF side logic gate is opened by said decoder which operates to select one of the logic gates in accordance with the identification flag.

5. A system as set forth in claim 4, wherein said address for fetch includes both upper bits and lower bits, and the upper and lower bits passing through the OP side or IF side logic gate opened by said decoder, the lower bits being used for accessing the corresponding tag or data storage unit to specify the address at which the upper bits are recorded, and the upper bits specifying the address for fetch in terms of a main storage unit address.

6. A system as set forth in claim 1, wherein each central processing unit includes an instruction unit, an execution unit and a storage control unit, and each OP side and IF side memory includes a comparing circuit having first and second inputs, and during said store operation, the address for buffer storage is provided by any one of the central processing units through the storage control unit, to store the related store data in the main storage unit at said address for storage, while the address for storage is applied to the main storage control unit to determine whether an address identical to the address for storage exists in any of said OP and IF side memories, by means of the comparing circuits, the comparing circuits receive, at each first input, said address for storage, at the second inputs respective address data from the respective OP side and IF side memory, and said identification flag indicative of the OP side or IF side being produced by the OP side comparing circuit or the IF side comparing circuit, if coincidence of the two addresses, at the first and second inputs thereof, occurs.

7. A system as set forth in claim 6, wherein each of said OP side tag storage units including an OP side logic gate and each of said IF side tag storage units including an IF side logic gate, either the OP side logic gate or the IF side logic gate is opened in accordance with the identification flag to allow the related address for storage to pass therethrough and invalidate the identical address applied in the corresponding OP side tag storage or IF side tag storage.

8. A system as set forth in claim 7, further including an OP side flip-flop and an IF side flip-flop and wherein said OP side logic gate or said IF side logic gate is opened by the output from the OP side flip-flop or the IF side flip-flop, the OP side flip-flop is set by the corresponding OP side comparing circuit when the coincidence is detected by the corresponding OP side comparing circuit, and the IF side flip-flop is set by the corresponding IF side comparing circuit when said coincidence is detected by the corresponding IF side comparing circuit, the outputs from these flip-flops forming said identification flag.

9. A system as set forth in claim 8, wherein said address for storage included both upper bits and lower bits, the upper bits specifying the address for storage, in terms of a main storage unit address, and being applied to the first input of each said comparing circuit, the lower bits passing through the respective opened logic gate and accessing the corresponding OP side or IF side tag storage unit for invalidation of the accessed address for storage.

10. A buffer storage control system connected to a main storage unit, comprising:
   a central processing unit (CPU), comprising:
     storage control means for producing a fetch address for fetching instructions and data from said main storage unit and an identification flag indicating whether the fetch address is an instruction or data address;
     CPU determination means, connected to said storage control means, for indicating that the fetch address is an instruction or data address in dependence upon the identification flag;
     CPU instruction tag storage means, connected to said CPU determination means, for storing as a CPU instruction tag, the fetch address of a fetched instruction fetched from the main storage unit in dependence upon the indication of an instruction fetch address by said CPU determination means;
     instruction storage means, connected to said CPU tag storage means and said main storage unit, for storing the fetched instruction, fetched from the main storage unit, in correspondence with the CPU instruction tag and in dependence upon the indication of an instruction fetch address by said determination means;
     CPU data tag storage means, connected to said CPU determination means, for storing as a CPU data tag the fetch address of fetched data fetched from the main storage unit in dependence upon the indication of a data fetch address by said determination means; and
     data storage means, connected to said CPU data tag storage means and said main storage unit, for storing fetched data, fetched from the main storage unit, in correspondence with the CPU data tag and in dependence upon the indication of a data fetch address by said determination means; and
   a main storage control unit (MCU) connected to said central processing unit storage control means to receive the fetch address and the identification flag, said main storage control unit comprising:
     MCU determination means, connected to said storage control means, for indicating that the fetch address is an instruction or data address in dependence upon the identification flag;
     MCU instruction tag storage means, coupled to said MCU determination means, for storing as an MCU instruction tag the fetch address of the fetched instruction in dependence upon the indication of an instruction fetch address by said MCU determination means; and
     MCU data tag storage means, coupled to said MCU determination means, for storing as an MCU data tag the fetch address of the fetched data in dependence upon the indication of a data fetch address by said MCU determination means.

11. A buffer storage control system connected to a main storage unit, comprising:
   a central processing unit (CPU), comprising:
     storage control means for producing a storage address and an identification flag indicating whether the storage address is an instruction or data address; and
   a main storage control unit (MCU) connected to said central processing unit storage control means to receive the storage address and the identification flag, said main storage control unit comprising:
     MCU determination means, connected to said storage control means, for indicating that the storage address is an instruction or data address in dependence upon the identification flag;
     MCU instruction tag storage means, connected to said MCU determination means and said storage control means, for reading out the contents of an instruction tag in dependence upon the indication by said MCU determination means and said storage address;
     instruction storage address comparison means, connected to said MCU instruction tag storage means and said storage control means, for comparing the contents of the instruction tag readout with the storage address and producing an instruction invalidation signal when coincidence occurs;
     MCU data tag storage means, connected to said MCU determination means and said storage control means, for reading out the contents of a data tag in dependence upon the indication by said determination means and said storage address; and
     data storage address comparison means, connected to said MCU data tag storage means and said storage control means, for comparing the contents of the data tag read out with the storage address and producing a data invalidation signal when coincidence occurs; and
   said central processing unit further comprising:
     CPU determination means, connected to said instruction and data address storage comparison means, for indicating an instruction or data address in dependence upon the data and instruction invalidation signals;

instruction tag storage means, connected to said storage control means and said CPU determination means, for invalidating an instruction tag, including the address of a stored instruction tag corresponding to the storage address, in dependence upon the determination by said CPU determination means; and data tag storage means, connected to said storage control means and said CPU determination means, for invalidating a data tag, including the address of a stored data tag corresponding to the storage address, in dependence upon the determination by said CPU determination means.

* * * * *